(12) United States Patent
Gagliano et al.

(10) Patent No.: US 7,104,246 B1
(45) Date of Patent: Sep. 12, 2006

(54) SPARK IGNITION MODIFIER MODULE AND METHOD

(75) Inventors: Howard Gagliano, Kingston, TN (US); Marion M. Satterfield, Oak Ridge, TN (US)

(73) Assignee: Smart Plug, Inc., Kingston, TN (US)

( * ) Notice: Subject to any disclaimer, the term of this patent is extended or adjusted under 35 U.S.C. 154(b) by 0 days.

(21) Appl. No.: 11/100,662

(22) Filed: Apr. 7, 2005

(51) Int. Cl.
*F02B 19/12* (2006.01)

(52) U.S. Cl. ............................ 123/266; 123/169 PA; 123/268; 123/293

(58) Field of Classification Search ............ 123/143 B, 123/169 PA, 266, 268, 293; 313/143
See application file for complete search history.

(56) References Cited

U.S. PATENT DOCUMENTS

| | | | | |
|---|---|---|---|---|
| 753,795 A | * | 3/1904 | Hart ............................ 313/143 |
| 1,511,739 A | * | 10/1924 | McDowell ............ 123/169 PA |
| 1,766,740 A | * | 6/1930 | Bitchman ............. 123/169 PA |
| 2,057,390 A | * | 10/1936 | Metailler ............... 123/169 PA |
| 2,127,512 A | * | 8/1938 | Harper, Jr. ............ 123/169 PA |
| 3,710,772 A | * | 1/1973 | Warner .................. 123/169 PA |
| 4,218,993 A | | 8/1980 | Blackburn |
| 4,542,724 A | * | 9/1985 | Blais .......................... 123/266 |
| 4,646,695 A | | 3/1987 | Blackburn |
| 4,696,269 A | | 9/1987 | Blackburn |
| 4,930,473 A | * | 6/1990 | Dietrich ...................... 123/266 |

\* cited by examiner

*Primary Examiner*—T. M. Argenbright
(74) *Attorney, Agent, or Firm*—Pitts & Brittian, P.C.

(57) ABSTRACT

A multi-part module including a flame cone and a connector adapted to be interposed between the normal spark plug port in an internal combustion engine block and a spark plug suitable for use with the engine in question. In the method, a quantity of fuel/air mixture is captured in a chamber which also houses the electrode of a spark plug. Upon generation of a spark from the spark plug, this quantity of fuel/air mixture ignites, generating a flame which propagates through one or more channels in a flame cone interposed between the spark plug and the cylinder of the engine and exits into the cylinder through multiple directionally oriented ports, whereupon the flame fronts rapidly ignite substantially all the fuel/air mixture held within the cylinder.

11 Claims, 6 Drawing Sheets

Fig.14

SPARK IGNITION MODIFIER MODULE AND METHOD

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The modern internal combustion engine such as used in automobiles, trucks, and like vehicles has been refined and improved over the years since its inception. One aspect of this type engine, namely the igniting of the air/fuel mixture in the combustion chambers has been largely ignored.

In combustion engines, the spark plug is depended upon to ignite a chemically correct air/fuel mixture (approx. 15:1) in a large cylinder head. To accomplish this task, the ignition is started before the piston reaches the top dead center of the compression stroke. This is known as the spark advance and can be as much as 40 degrees before the top of the compression stroke. It therefore may be recognized that any work that is started before the end of the compression stroke is negative and is dissipated as heat in the engine.

Commonly engines operate at a 10 to 20 percent richer mixture than the chemically correct air/fuel ratio. This inefficiency results in lower gas mileage and the high exhaust pollutants of carbon monoxide and hydrocarbons. Hydrocarbons are the result of unburned gases. High compression ratio engines operate at high combustion temperatures and thereby create higher concentrations of nitrogen oxides. To reduce nitrogen oxides, nominal compression ratios have dropped from a high of 10.5:1 to 8:1.

U.S. Pat. Nos. 4,218,993; 4,646,695 and 4,696,269 are directed to a method and apparatus for the iginition of a fuel-air mixture in an internal combustion engine, employing a flame front. In the inventions disclosed in these patents, a jet of hot flame of high velocity is injected into the engine cylinder which is charged with a fuel/air mixture under pressure. Whereas the disclosures of these patents recognize the inherent inefficiency of the commonly employed spark plug as the igniter of the fuel/air mixture within the cylinder, and teach the use of a flame generated at the spark plug and propagated into the engine cylinder, these prior art concepts suffer from the difficulty of adjusting the proximity of the electrode of the spark plug to the cylinder. This problem is exacerbated by reason of the large differences between engine geometries, differences between the physical relationship of the electrode of the spark plug and the cylinder of difference engines, among other inherent problems relating to positioning, propagation and alignment of the flame front(s) with respect to the cylinder and its piston and intake valve, for example.

BRIEF SUMMARY OF THE INVENTION

In one embodiment of the present invention, there is provided a two-part module adapted to be interposed between the normal spark plug port in an internal combustion engine block and a spark plug suitable for use with the engine in question.

In accordance with one aspect of the present invention, the efficiency of operation of a common prior art combustion engine is enhanced by ignition of the air/fuel mixture present in a cylinder of the engine near the top dead center of the compression stroke of a piston disposed within the cylinder, by means of a flame which originates in a remote combustion chamber disposed externally of the cylinder of the engine and between the common spark plug and the interior of the cylinder of the engine and propagated into the cylinder in the form of at least one and preferably two or more flame fronts. In a preferred embodiment, one flame front is directed into the cylinder adjacent the intake port of the cylinder and the other is directed over generally the central area of the piston head disposed in the cylinder.

Compared to a jet of flame, a spark is a feeble igniter of a fuel/air mixture contained within a cylinder of a conventional internal combustion engine. Moreover, spark ignition requires significant time to achieve smooth and nearly complete combustion of the fuel/air mixture, thereby requiring relatively high octane ratings of the fuel, ignition in advance of optimum timing, and resultant generation of excessive pollutants.

DETAILED DESCRIPTION OF THE INVENTION

Figure 1:
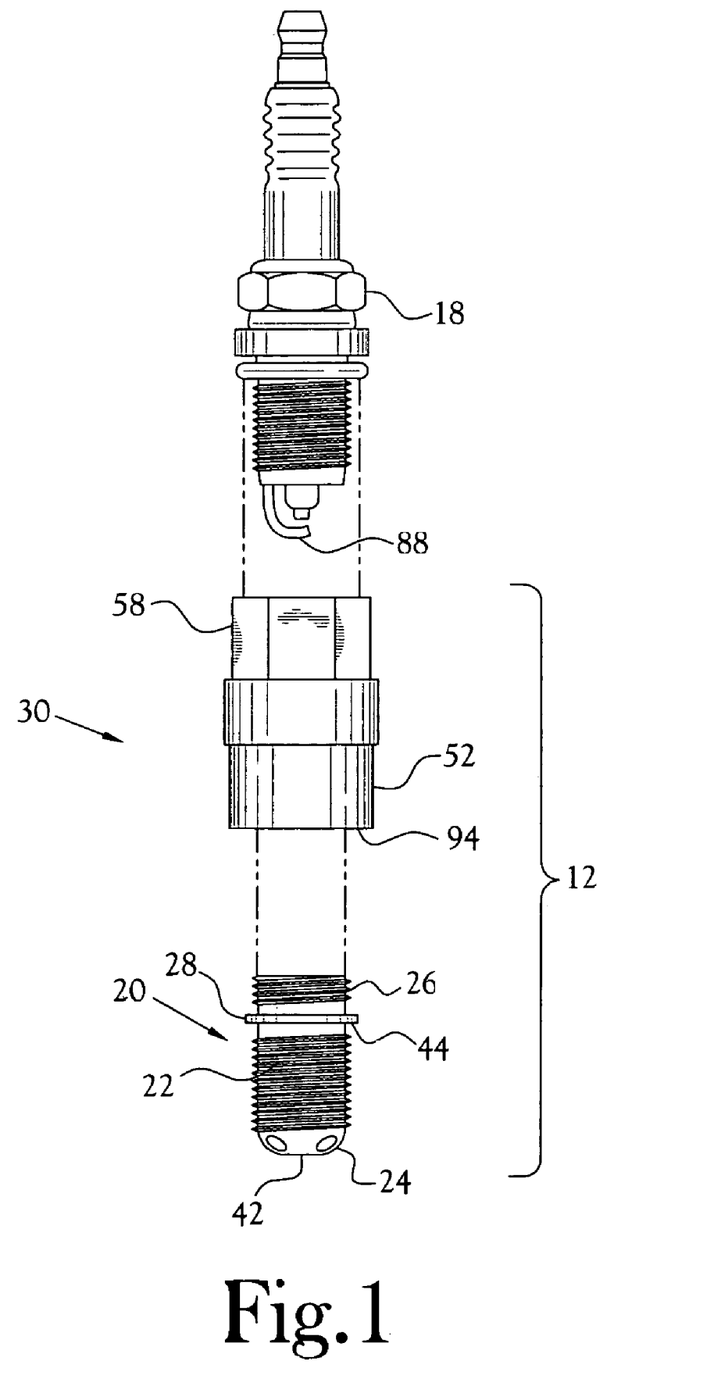
FIG. 1 is an exploded view of a two-element module and a spark plug assembly in accordance with various features of the present invention.
Figure 2:
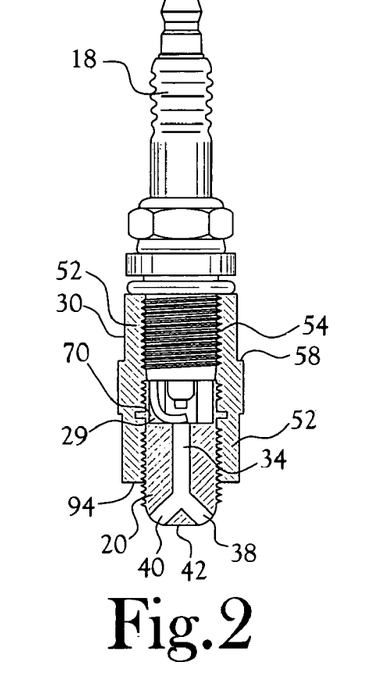
FIG. 2 is a side elevation view, in section, of the two-element spark plug assembly depicted in FIG. 1.
Figure 3:
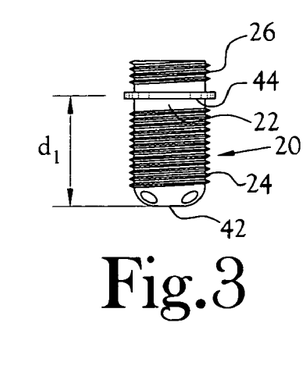
FIG. 3 is a side elevation view of a flame cone element of a module of the present invention.
Figure 4:
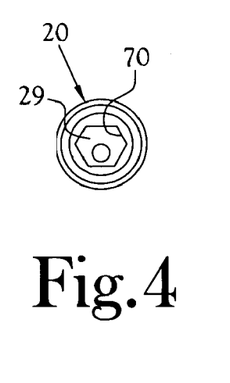
FIG. 4 is an end view of the right-hand end of the flame cone element depicted in FIG. 3.
Figure 5:
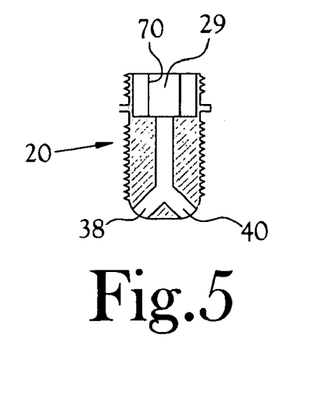
FIG. 5 is a side elevation view, in section, of the flame cone element depicted in FIG. 3.
Figure 6:
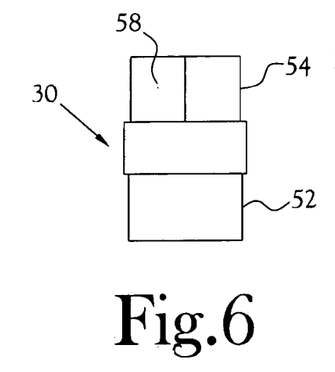
FIG. 6 is side elevation view of a connector element of the module of the present invention.
Figure 7:
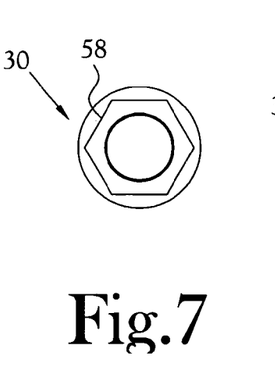
FIG. 7 is an end view of the right-hand end of the connector element depicted in FIG. 6.
Figure 8:
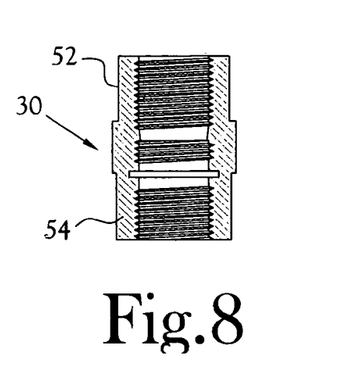
FIG. 8 is side elevation view, in section, of the connector element depicted in FIG. 6.

In one embodiment of the present invention, there is provided a two-element module 12 designed to be interposed between the existing threaded spark plug port 14 to an engine block 16 and the spark plug 18 itself. The first element of the module is designated as a flame cone 20 and comprises a first, generally cylindrical body portion 22 including a first end portion 24 and an opposite second end portion 26. A circumferential flange 28 projects outwardly of the outer circumference of the body portion intermediate the first and second end portions to define the demarcation between the first and second end portions of the flame cone.

The first end portion 24 of the flame cone element is externally threaded to be threadably received within an existing internally threaded spark plug port 14 of an engine block 16. The second end portion 26 is externally threaded to be threadably received within a first end 52 of a second element 30 (designated a connector) of the module. The flame cone of the module is provided with a internal chamber 29 (See FIG. 2) which opens outwardly of the outboard second end 26 of the flame cone. Further, there is provided a flame channel 34 which provides fluid communication between the chamber 29 and the environment ambient to the first end 24 of the flame cone, that is, within the cylinder 46 in the engine block when the module is assembled with an existing engine block 16. Immediately prior to this channel 34 exiting the first end of the flame cone, the channel is divided to provide first and second flame ports 38 and 40, respectively, exiting the first end of the flame cone and through which flame fronts 84 and 86 enter the engine cylinder.

The location of the demarcation flange 28 is selected as a function of the engine with which the present invention is to be employed. Specifically, the distance between the most outboard tip 42 of the first end 24 of the flame cone and the inboard face 44 of the circumferential flange 28 of the flame cone 20 is chosen to limit the extent of insertion of the flame cone into the block, hence into the cylinder, that distance wherein the first end 24 of the flame cone is positioned adjacent to, but not in engagement with, the internals of the engine cylinder. As the flame cone is so positioned in the spark plug port of the block, the exit ports 38 and 40 are spaced apart from the engine block in position for propagation of flame fronts 84 and 86 therefrom over the intake valve 78 and piston head 80 within the block (See FIG. 12). By design, at such separation distance, the inboard face of the flange engages the engine block to limit further insertion of the flame cone into the block.

In this embodiment of the module, the second element thereof comprises a generally cylindrical hollow connector 30 adapted to be interposed between the flame cone 20 and a common spark plug 18 suitable for the engine in question. This connector includes an internally threaded first end 52 to threadably receive therein the second end portion 26 of the flame cone 20. A distal portion of the internal circumference of the first end of the connector is bored to define a shouldered cavity 92 of a diameter and depth sufficient to receive therein the flange of the flame cone. The opposite second end 54 of the connector is internally threaded to receive the electrode 88 of a common spark plug. When the flame cone and the connector are assembled, the electrode of the spark plug is disposed within the chamber 29 defined in the outboard end of the flame cone. The second end 54 of the connector is provided with a multi-sided male socket geometry 58 on the outer circumference thereof. This male-type socket geometry is adapted to receive thereover a suitable tool for imparting rotational movement of the connector independent of rotation of the flame cone.

Alignment of the exit ports 38 and 40 of the bifurcated channel 34 of the flame cone 20 is of importance in the present invention, thereby giving rise to the need for initial alignment of these exit ports with the intake valve and/or the piston head within the engine cylinder, for example, and maintenance of this alignment of the exit ports as the flame cone is "locked" with respect to the engine block. To this end, the present inventors provide for independent rotational adjustment of the flame cone 20 and the connector 30 in the course of assembly of these elements with the spark plug port in an engine block and with one another. Whereas in the present application, the flame cone includes tow exit ports and at least one exit port is oriented to direct a flame front toward an exhaust valve and the other exit port is directed toward the piston, it will be recognized that other orientations of these two ports, or provisions of more than two exit ports having different orientations may be employed.

Figures 9, 10, 11:
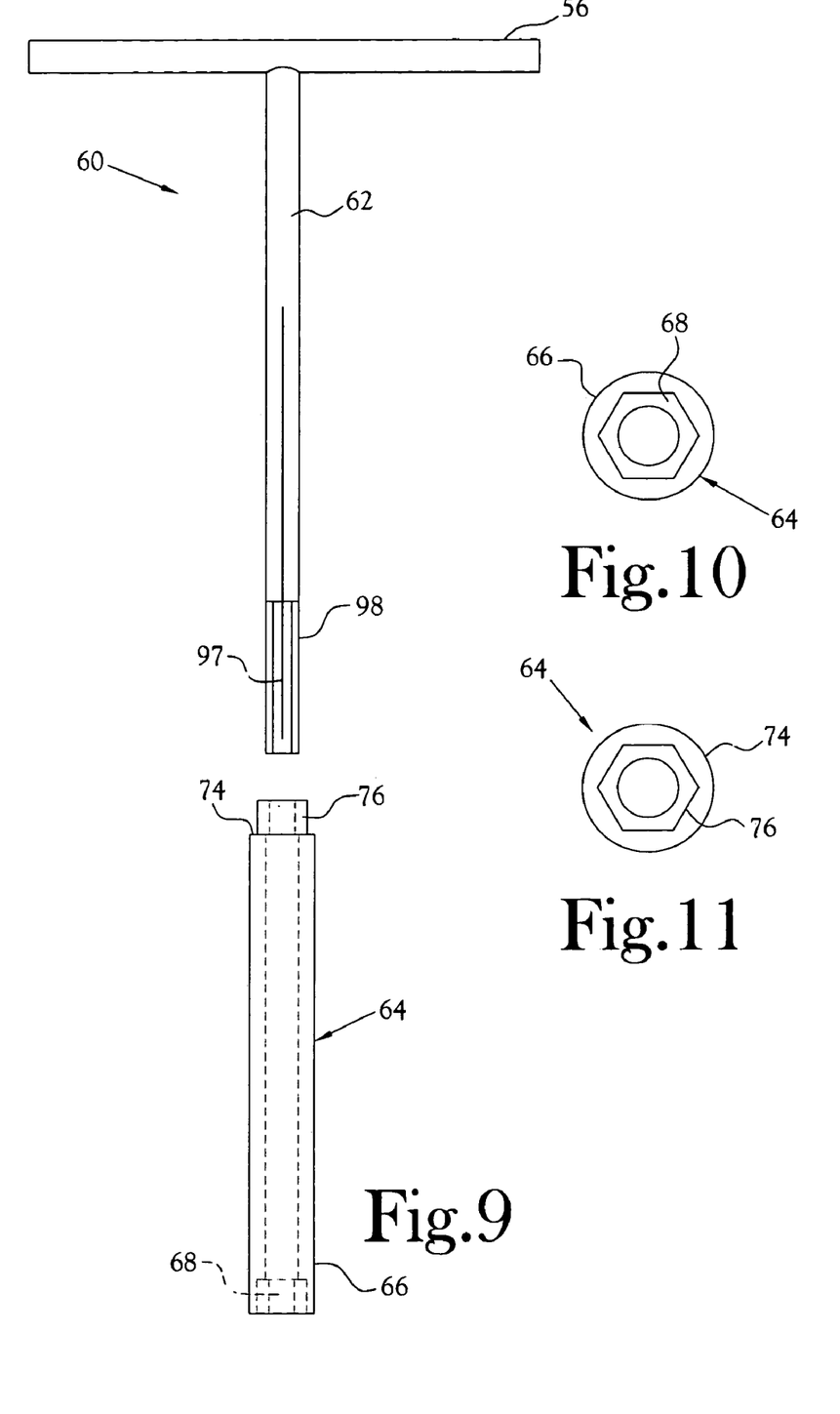
FIG. 9 is a side elevation view of an installation tool useful in the present invention.
FIG. 10 is an end view of the left-hand end of the tubular section depicted in FIG. 9.
FIG. 11 is an end view of the right-hand end of the tubular section depicted in FIG. 9.

Also to this end, in one embodiment, the outwardly opening chamber 29 in the second end 26 of the flame cone 20 is of an internal side wall 70 geometry which defines a multi-sided female-type socket which is adapted to temporarily receive therein the male-type end 62 of a mating socket tool 60 (See FIG. 9). This tool is designed with an elongated cylindrical handle 56 and an elongated shaft 62 which extends perpendicularly from the handle. This shaft freely passes through the hollow connector 30 and terminates in a male-type socket adapted to engage the female socket defined in the chamber 29 of the flame cone. In one embodiment, the geometry of the female-type socket and the geometry of the male-type end of the tool shaft are chosen to permit only one rotational alignment of the female-type and male-type sockets with respect to one another and which allows these sockets to engage one another. This feature of the invention provides a physical indicator of the alignment of the exit ports of the flame cone with the tool, thereby giving a user knowledge, hence control over, the rotational position of the flame cone, thereby providing for initial alignment of the flame cone with the internals of the cylinder and maintenance of such alignment while "locking down" the position of the flame cone through independent rotation of the connector independent of the rotational position of the flame cone.

In a preferred embodiment, the tool shaft is magnetized to enhance retention of flame cone on the tool during its installation in the engine block.

In the depicted tool, there is further provided a hollow cylindrical sleeve 64 which is freely slidable along the length of the shaft of the tool 60. A first end 66 of this sleeve is internally formed to define a female-type socket 72 adapted to be received within the male-type socket 58 geometry of the second end 54 of the connector. By this means, rotation of the sleeve can effect rotation of the connector.

The opposite and second end 74 of the sleeve is provided with an external male-type socket geometry 76 adapted to be engaged by a common wrench (not shown) for rotation of the sleeve relative to the shaft and resulting rotation of the connector.

In a preferred embodiment of the present invention, assembly of the module with the engine includes the steps of threading the second end of a flame cone into the first end of the connector until the flange 28 on the flame cone is fully contained within the cavity 92 bored in the first end of the connector and the inboard face 44 of the flange is substantially flush with the outboard face 94 of the first end of the connector, thereby leaving unoccupied internal threads within the first end of the connector for rotational adjustment of the flame cone relative to the connector in the course of subsequent alignment of the ports of the flame cone with the internals of the cylinder.

Further, by positioning the inboard face of the flange and the outboard face of the connector flush with one another, these two faces substantially simultaneously engage the engine block as the flame cone and the accompanying connector are threaded into the engine block.

This subassembly of the flame cone and the connector are thus also readily handled as a unit. For insertion of the flame cone into the engine block, the distal end 98 of the tool shaft 62 is inserted through the hollow connector and into the combustion chamber 29. Rotation of the tool thus effects threading of the flame cone into the engine block, carrying the connector with it. The degree of insertion of the flame cone is limited by the inboard face 44 of the flame cone engaging the engine block.

The degree of insertion of the flame cone into the engine block is limited by the circumferential flange on the flame cone whose location along the length of the flame cone is a function of the engine in question. That is, the maximum distance to which the first end of the flame cone can be inserted into the block is limited by the flange acting as a stop upon its contact with the block of the engine. In the present invention, this maximum distance is chosen (for a given engine) such that the first end of the flame cone is initially disposed adjacent, but spaced apart from, the inner wall 83 of the engine block 16. This initial positioning of the flame cone does not assure the desired alignment of the exit ports in the end of the flame cone with respect to the internals of the engine block, such as the intake valves 78, the piston 80 and/or the exhaust valves 82. Rather, this initial insertion limit of the flame cone provides for at least one or more full turns of the flame cone relative to the connector after the connector has been bottomed out against the engine block but has not been forced into its "locking" relationship with the flame cone.

This initial insertion of the flame cone into the spark plug port does not assure the desired alignment of the exit ports in the end of the flame cone with the internals of the cylinder. However, noting that the flame cone and the connector are rotatable relative to one another, adjustment of the rotational position of the exit ports 38 and 40 of the flame cone with the internals of the cylinder is made possible.

Specifically, it is noted that in accordance with one aspect of the present invention, the geometry of the multi-sided inner wall of the combustion chamber 29 provides for only one permissible rotational position of the shaft 62 in order for the shaft to enter the combustion cavity. In the present tool, that side of the multi-sided geometry of the male end of the shaft is visibly marked 97 for ready identification thereof. Further, in the preferred embodiment, that side of the multi-sided geometry of the combustion chamber which matingly receives the marked side of the end of the shaft therein, is, by design, aligned with one of the exit ports 38 and 40, preferably that one of the exit ports which desirably is to be oriented toward the intake valve in the cylinder. Thus, the visible marking on the shaft corresponds to the desired location of that exit port which is to be aligned with the intake valve. For all known internal combustion engines, the position of the intake valve of each cylinder of the engine is available from any of several well-known publications dealing with maintenance and repair of engines and is well known by a mechanic skilled in the art. The installer thus can readily rotate the tool shaft to rotate the flame cone relative to the "fixed" connector to align the marking on the shaft with the known location of the intake valve of the cylinder, thereby orienting the desired exit port with such intake valve.

As so positioned, rotation of the handle/shaft of the tool may be employed to rotate the flame cone, and rotation of the sleeve may be employed to rotate the connector, these rotations being independent of one another. For these purposes, the first end of the connector is internally bored a distance slightly in excess of the wall thickness of the circumferential flange on the adaptor so that such flange can be fully received within the interior of the first end of the connector.

Final alignment of the exit ports of flame cone and "locking" down the flame cone once such alignment is achieved, may be effected employing the tool depicted in FIGS. 9–11. To this end, once the exit ports have been aligned properly, the shaft of the tool is held against further rotation and the sleeve, hence the connector, is rotated to cause the outboard face of the first end of the connector to move into physical engagement with the engine block adjacent the spark plug port, and, with further force applied thereto, to cause the internal threads of the connector and the external threads of the second end of the flame core to bind together, such that the connector functions in the nature of a "lock nut" to lock the flame cone (and the connector) against inadvertent or unintentional rotation of the flame cone out of its alignment with respect to the internals of the engine block. Thereupon, the tool and sleeve are withdrawn from both the flame cone and the connector, leaving the second end of the connector free to theadably receive a common spark plug therein. As noted hereinabove, seating of the spark plug in the connector positions the electrode of the spark plug within the chamber 29 of the flame cone.

Operationally, once the module and spark plug have been installed as described above, movement of the piston within its cylinder during a compression stroke of the engine forces fuel/air mixture into the exit ports 38 and 40 of the flame cone, thence along the channel 34 and into the chamber 29, and resulting intimate exposure to the electrode of the spark plug. Thereupon, firing of the spark plug ignites the fuel/air mixture in the chamber 29, generating a flame which propagates along the channel 34, the exits through the exit ports 38 and 40 in the form of multiple (two in the depicted embodiment) flame fronts.

In one embodiment of the present invention, the orientation of the bifurcated flame fronts is chosen to cause one of the flame fronts to be directed toward the intake valve and the other of the flame fronts to be directed over the head of the piston, of the engine. These flame fronts ignite the fuel/air mixture within the engine block significantly more rapidly than does a spark. This factor permits the ignition of the fuel/air mixture at a time very close to, or even concurrent with, the piston achiveing a dead top position, thereby enhancing the efficiency of the operation of the engine through the means of more complete combustion of the available fuel/air mixture. Further, the more complete combustion of the fuel/air mixture creates lesser amounts of undesirably combustion products, hence a more environmentally friendly engine.

Testing of the present invention was performed using a four-cylinder internal combustion engine installed in a CX Honda Civic VIN #ZHGEH2356NH530852. This vehicle represents the same gasoline cylinder head that was used on Honda Civic and Honda Accords between the years of 1992 and 2000. These particular automotive heads use NGK spark plug ZFR5F11. The design (a fuel 4 cylinder ecu controlled engine with an internal coil in the distributor and "return" fuel line system) was used widely by manfacturers other than Honda, such as Nissan, Toyota, Chevrolet, Ford, Hyundai, Mitsubishi, Geo, Saturn and BMW during the span of 1992 and 2000.

The test engine was initially fully inspected, including downloading the data menu in the ecu, checking of all of the car's sensors, testing compression and a full leak down to test for stuck valves. The oil, plug wires and plugs in the engine were replaced with new oil, plug wires and plugs.

An Apexi® S-AFCII (Super Airflow Converter) was installed in the vehicle. An S-AFCII is a device that piggybacks onto the ecu to increase or decrease the percentage of fuel the engine will use in small rpm increments. Further, there was installed a Wide Band 02 meter in the vehicle for monitoring exact air fuel ratios (AFR's) while operating the engine. A perfect AFR for this engine is 14.7. Smog tests (emissions) using equipment certified by the State of Georgia were performed with and without the present invention installed in the engine.

Several miles per gallon tests, all on one-hundred mile runs, were performed. Different fuel maps, tuned in by the S-AFCII, were utilized, some with and some without modifications to the vehicle's stock fuel pressure regulator. Dyno (dynometer) tests were performed before and after installation of the present invention, on separate days.

Four separate emissions test were performed on a five gas analyzer. The first test was a base line stock run without the present invention. The other three tests used the present invention installed in lieu of the stock spark plugs of the engine, and took advantage of three different fuel maps all with different degrees of correction. The five gas analyzer tests for $CO_2$, CO, HC, $O_2$, NOX and monitors the AFR. In the three tests the $CO_2$ emissions were lower by 5.7%. The CO emissions were lowered by 1.75% to ½ of the required percentage by the State of Georgia standards. The HC was lowered by 476 parts per million (ppm). In one of the fuel maps the HC increased, but was subsequently corrected by an adjustment in timing. The $O_2$ decreased by 0.51% and the NOX decreased by 32 ppm. Considering that the Honda test vehicle is known for its fuel consumption efficiency in stock form, these reductions in emissions are considered even more spectacular.

The gas mileage of the test engine (vehicle) was improved through the use of the present invention. In city driving, using the stock engine (without the present invention), the gas mileage during city/highway driving was a consistent 23–24 miles per gallon (mpg). With the present invention stalled in the test vehicle engine, this mileage increased to 32–33 mpg for city driving, a gain of 9 mpg. This 40% increase in mpg converts into 40% savings in fuel consumption. Results of highway driving tests are in progress, but are anticipated to be show an even greater gain in mpg.

Using the present invention, engine torque increased by 0.5, with 2 horse power increase in the test engine as compared to the stock engine without the present invention installed.

In all of the foregoing noted tests, the flame cone included two exit ports, one of which was oriented toward an intake valve and the other of which was oriented toward an exhaust valve. Three-exit port flame cones were tested without regard to the directional orientation of the exit ports within the cylinder. Initial tests of this embodiment of the present invention showed even more favorable results.

In dynometer testing of the test engine baseline runs were conducted with the timing at top dead center. After installing the present invention in the engine, the horsepower rating showed a loss of 3½ hp and a gain of ½ lb of torque. Whereas the loss of 3½ hp is insignificant to a driver of the vehicle, the ability to achieve a gain in torque while also using 40% less fuel is considered phenomenal. This achievement occurred while also running the engine at the optimum AFT of 14.7 and producing less emissions.

Figure 12:
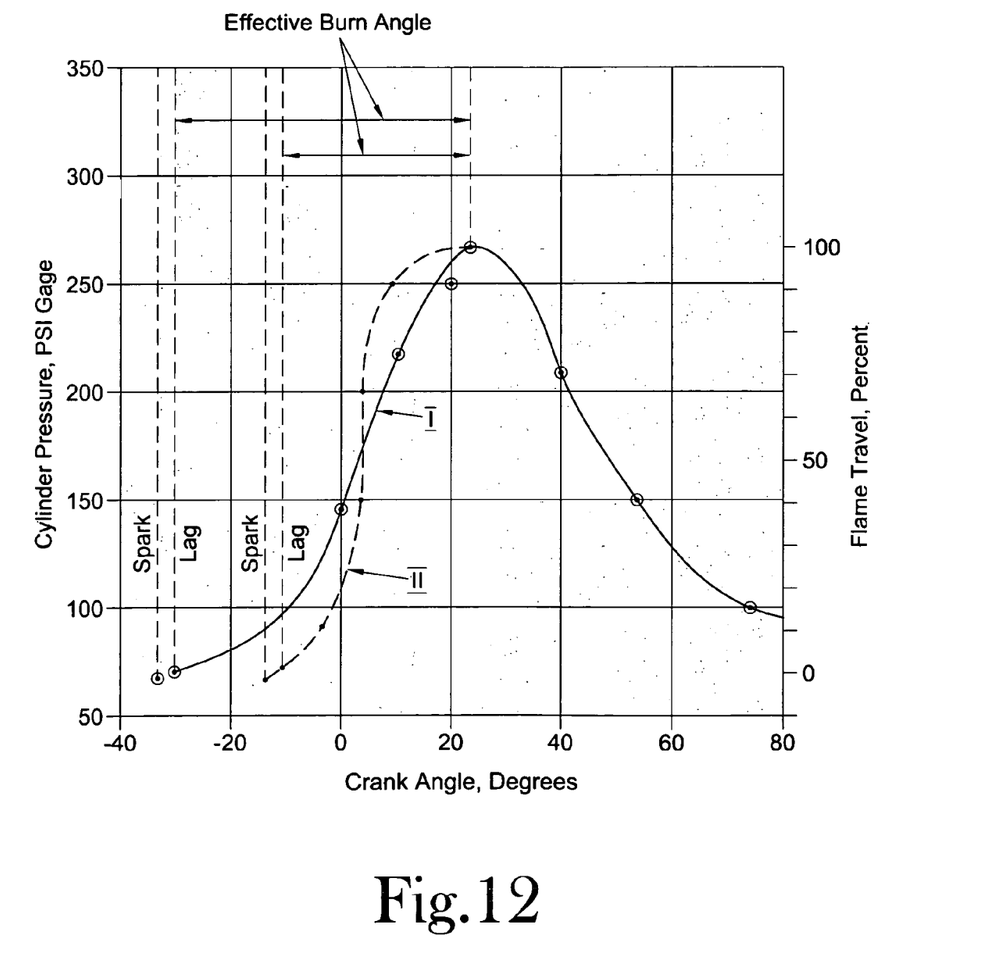
FIG. 12 is a graphic illustration of the concept of spark advance in an internal combustion engine and showing the spark advance applicable employing the present invention.
Figure 13:
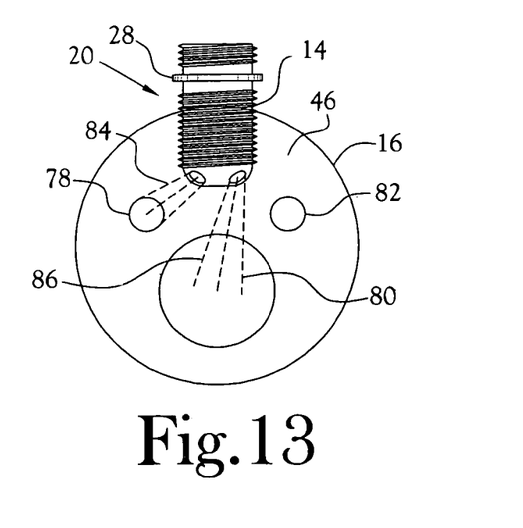
FIG. 13 is schematic representation of the block, cylinder, intake valve, exhaust valve and piston of a common internal combustion engine incorporating therein various features of the present invention.
Figure 14:
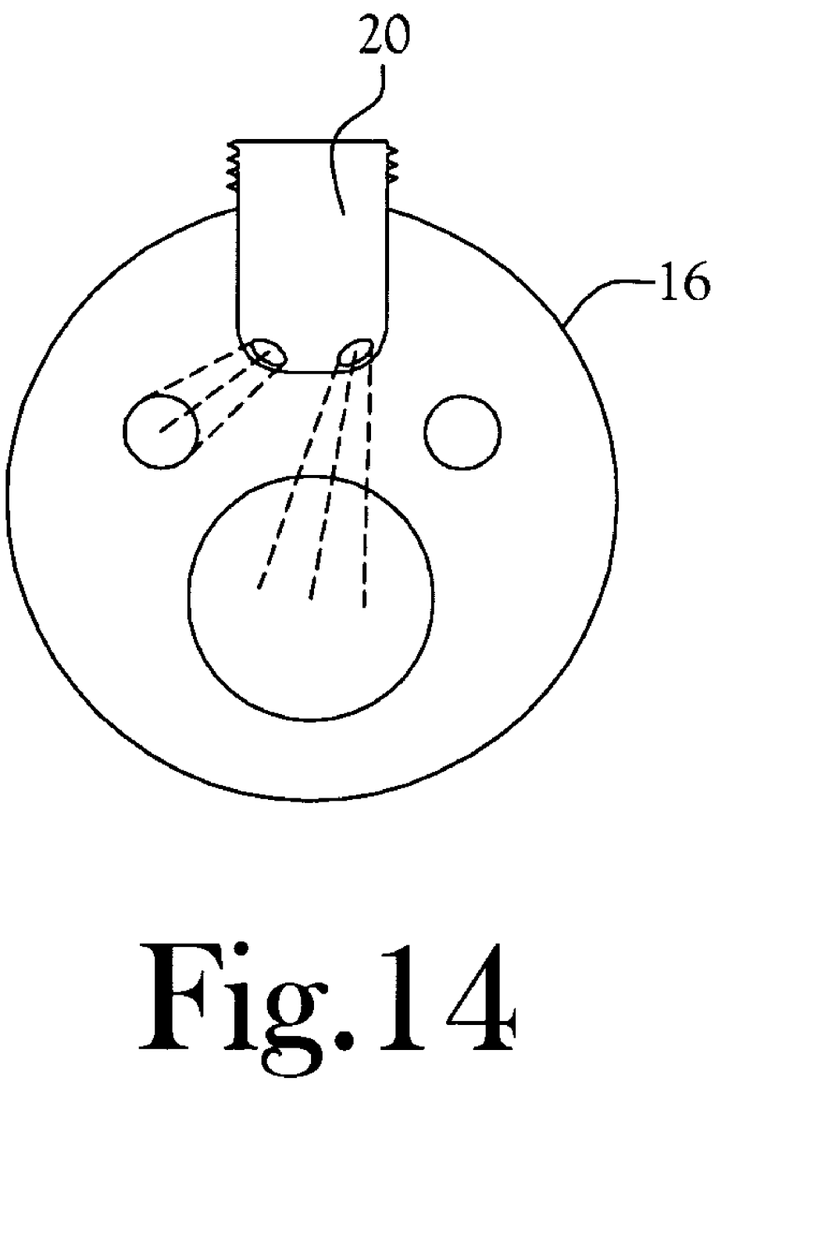
FIG. 14 is a schematic representation of the block, cylinder, intake valve, exhaust valve and piston of a common internal combustion engine incorporating a flame cone integral with the block of the engine.

FIG. 12 depicts cylinder pressure versus crank angle of a typical internal combustion engine and percent flame travel. From this graph, it is noted that the effective burn angle of a fuel/air mixture in the cylinder of an internal combustion engine ranges from about 35 degrees prior to dead center of the engine piston on its compression stroke to about 25 degrees past such dead center, in a prior art internal combustion engine. In this effective burn angle range, there is a spark lag of about 5 degrees upon the commencement of ignition of the fuel/air mixture within the cylinder. The curve labeled I represents the burn of the fuel/air mixture of this prior art engine. The curve labeled II in FIG. 12 depicts the burn curve for an internal combustion engine fitted with the module of the present invention. It is to be noted that curve II permits ignition to commence at about 15 degrees prior to top dead center of the piston, and ignition proceeds materially more rapidly than in the prior art engine. Thus, it is seen that the presence of a module of the present invention in an otherwise prior art engine, reduces the amount of energy lost as heat prior to the piston passing its dead center on its compression stroke. Moreover, the rate of burn of the fuel/air mixture in the modified engine is significantly increased, thereby enhancing the efficiency of operation of the modified engine.

Whereas the present invention has been described in specific terms and specific structure, it will be recognized that equivalent structure may be employed. For example, the flame cone may be an integral part of the engine block as opposed to threadable insertion of the flame cone in an existing spark plug port in the block.

Further, the installation tool disclosed herein is a preferred tool, but it will be recognized that other embodiments of an installation tool may be employed.

What is claimed is:

1. A module for interposition between the common spark plug of an engine and the engine block, the module comprising
    a flame cone having a first end and an opposite second end, said first end being adapted for positioning within an engine block in functional operating relationship to internals of the engine,
    said flame cone including a channel extending between said first and second ends and providing for fluid communication between said engine block and along the length of said flame cone,
    a combustion chamber defined in said second end of said flame cone, said channel being in fluid communication with said combustion chamber,
    a hollow tubular connector having first and second ends, said first end of said connector being adapted to threadably engage said second end of said flame cone,
    said second end of said connector being adapted to threadably receive a spark plug having a distal electrode, said connector being of a length such that when said spark plug is seated within said second end of said connector, said electrode of said spark plug is disposed within said chamber of said second end of said flame cone.

2. The module of claim 1 wherein said flame cone is integrally formed with the block of said engine.

3. The module of claim 1 wherein said flame cone is threadably received within an existing spark plug port in the engine.

4. The module of claim 1 wherein said combustion chamber defined in said second end of said flame cone includes multiple side walls which collectively define a female-type socket and including external threads along said second end of said flame cone.

5. The module of claim 3 wherein said flame cone includes a circumferential flange disposed between said first and second ends of said flame cone, said flange defining a stop against insertion of said flame cone into said block.

6. The module of claim 1 wherein said first end of said connector is internally recessed to receive therein said circumferential flange of said flame cone, whereby said connector may be threadably adjusted with respect to said flame cone to the extent that said flange is receivable within said first end of said connector and said first end of said connector may engage said block and effect a locking of said external threads of said second end of said flame cone with said internal threads of said first end of said connector, whereby said flame cone and said connector are restrained against inadvertent or unintentional rotation of either said flame cone or said connection relative to one another and said flame cone is restrained against inadvertent or unintentional rotation of said flame cone relative to the engine block.

7. A method of igniting a fuel/air mixture within a cylinder of an internal combustion engine including an engine block, a cylinder defined within the block, a piston reciprocatably disposed within the cylinder, and an intake valve, comprising the steps of:

provided a combustion chamber at a location remote from the cylinder, providing a flame cone mounted in the engine block and projecting outwardly therefrom to define a fluid communication path between said combustion chamber and the cylinder, disposing a spark plug electrode proximate said combustion chamber, interposing a generally hollow cylindrical connector between said flame cone and said spark plug, said mounting providing for selectable linear movement of said spark plug relative to said combustion chamber whereby the extent of insertion of said electrode within said combustion chamber is selectable, whereby fuel/air mixture present in said cylinder moves from the cylinder through said flame cone and into said chamber in the course of the compression stroke of the piston, and when the piston is proximate its top dead center on its compression stroke, firing said spark plug to ignite said fuel/air mixture present in said combustion chamber and develop a flame front within said combustion chamber, whereupon said flame front propagates through said fluid communication path toward said cylinder, dividing said flame front into multiple flame fronts immediately prior to entry of said flame front into said cylinder, directing at least one of said flame fronts toward a first location within the cylinder, and at least one of said flame fronts toward a second location with the cylinder.

8. Apparatus useful for the ignition of a fuel/air mixture within a cylinder of an internal combustion engine which includes an engine block, a cylinder defined internally of the block, a piston reciprocatably disposed within the cylinder, and an intake valve, comprising:

an opening defined in the engine block and leading from internally to externally of the block, a flame cone having first and second opposite end portions, said first end portion being disposed within said opening in the block, a combustion chamber defined in said second end portion of said flame cone and at a location remote from said block, a channel providing for fluid communication between said cylinder and said combustion chamber, said channel being divided into multiple exit ports at said first end of said flame cone and internally of the cylinder, a hollow connector having first and second ends, said first end of said connector being connected to said second end of said flame cone;

said second end of said connector being adapted to receive therein the electrode end of a spark plug, a spark plug having an electrode end and an electrode exposed on said end, said electrode end of said spark plug being received within said second end of said connection with said electrode being disposed within said combustion chamber.

9. The apparatus of claim 8 wherein said combustion chamber includes a multi-sectional side wall defining a female-type socket for the receipt of an installation tool therein.

10. The apparatus of claim 8 wherein said second end of said flame cone includes external threads, said first end of said connector includes internal threads adapted to matingly receive said externally threaded second end of said flame cone therein, and shoulder means defined internally of said second end of said connector and adapted to engage said second end of said flame cone when said second end of said flame cone is disposed within said first end of said connector whereby rotation of said connector relative to said flame cone effects engagement of said first end of said connector with the block of the engine and a binding relationship of said external threads of said second end of said flame cone with said internal threads of said first end of said connector, thereby locking said flame cone and said connector against unintended or inadvertent rotation relative to either the block or to one another.

11. The apparatus of claim 8 wherein each of said multiple exit ports is oriented in different directions, hence different locations, within the cylinder.

* * * * *